3,169,152
ALKYLATION PROCESS AND APPARATUS
Joe Van Pool and Dave G. Blaker, both of Bartlesville, Okla., assignors to Phillips Petroleum Company, a corporation of Delaware
Filed Aug. 4, 1961, Ser. No. 129,405
11 Claims. (Cl. 260—683.48)

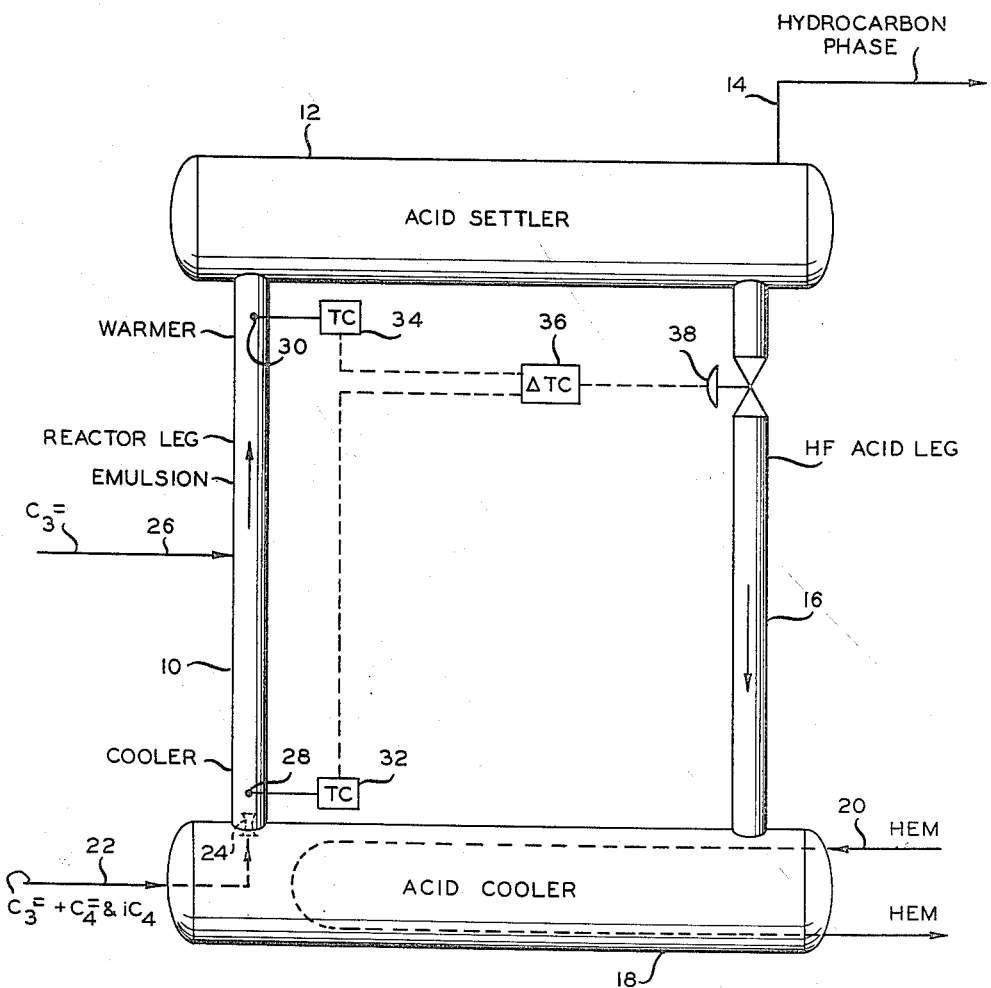

This invention relates to an improved process and apparatus for alkylating an isoparaffin with a plurality of olefins.

The alkylation of an isoparaffin such as isobutane or isopentane with olefins such as propylene, and amylenes has been practiced utilizing various alkylation catalysts, particularly, HF acid. In applications where more than one olefin is to be reacted with an isoparaffin it is customary to either inject both olefins into a reactor, along with the isoparaffin, or to conduct two separate alkylation steps in different reactors. Some prefer alkylating in separate reactors with different olefins because a higher yield and higher quantity alkylene can be produced in each instance. This is due to the fact that optimum reaction conditions are different for different light olefins such as propylene, butylenes, and amylenes. This invention is concerned with a method and apparatus for alkylating an isoparaffin with two or more light olefins in a single reactor which results in a high yield of high quality alkylate.

The invention is applicable to an alkylation system in which the reactants and acid are injected upwardly upwardly into an upright tubular reactor in which the isoparaffin is reacted with the olefins and from which the reaction product-acid emulsion flows into a acid settler, the acid is passed from the lower section of the settler to an acid cooler which is connected with the inlet end of the reactor, and the feed to the reactor is injected thru an eductor so as to effect the required flow of acid into the reactor. In this system the entire flow thru the system is produced by the injected feed.

A broad aspect of the invention comprises regulating the flow of acid from the settler to the acid cooler in response to temperature differential between a point selected adjacent the inlet or upstream end of the reactor and a point adjacent the downstream end or outlet end of the reactor. With a given acid temperature in the acid cooler, regulation of the flow of acid into the reactor tube is utilized to control the differential temperature between the selected temperature sensing points at the opposite ends of the reactor tube so that the alkylation with olefins of different compositions or molecular weights are effected within optimum temperature ranges in each instance.

To illustrate, when alkylating isobutane with butylenes and propylene, a lower temperature range prevails in the upstream end of the reactor and the temperature rises because of the exothermic reaction progressing in the reaction zone along the line of flow. The reaction of propylene with isobutane requires a higher optimum temperature range which prevails in the downstream section of the reactor.

It is preferred to inject the isoparaffin and two or more olefins in admixture thru the inlet end of the reactor. When reacting isobutane with butylenes and propylenes, butylenes react faster and at lower temperatures than does propylene, and most of the butylene is reacted in the upstream end of the reaction zone, but the propylene in traveling along with the reaction mixture as it rises in temperature is also heated to the optimum temperature for reaction by the time it arrives at the midsection of the reactor. The slower reacting propylene thus has a longer period of reaction than it does when injected at a point about midstream of the reactor. This preheating of the propylene facilitates its reaction with the isobutane at optimum temperatures in the downstream end and hotter section of the reactor. However, it is feasible and conductive to good results to introduce the lighter olefin (propylene) to an intermediate section of the reactor where the temperature has risen substantially from the inlet temperature.

When reacting isobutane with butylene, the optimum temperature of this reaction is in the range of 60 to 100° F. and when reacting propylene with isobutane, the optimum temperature is in the range of 95 to 130° F. The optimum temperature range for the alkylation of isobutane with amylenes is from 40 to 80° F. In the successive alkylation of isobutane with butylenes and with propylene, the temperature differential between the inlet end of the reactor and the outlet end is in the range of 10 to 30° F. In operation in which amylenes, butylenes, and propylene are injected progressively downstream in this order, the optimum temperature differential between the inlet end and the outlet end of the reactor is in the range of 20 to 50° F. Similar temperature and temperature differentials are applicable to the alkylation of isopentane with these olefins.

The isobutane-to-olefin ratio is in the range of 5 to 25 by volume and, preferably, is about 12. When alkylating with propylene and butylenes, it is preferred that 10 to 60 percent of the olefin feeds is propylene and the remainder is butylenes, the propylene and butylene being to separate feeds.

The catalyst is 86 to 95 percent by weight HF with a water content in the range of 0.1 to 0.5 percent and an acid-soluble oil content in the range of 0.1 to 5.0 percent, the remainder being dissolved hydrocarbons. The HF acid recycle rate is in the range of 0.25 to 10.0 volumes of HF per volume of hydrocarbon.

The reaction time is governed by the nature of the equipment used. In general this time of reaction is in the range of 20 to 40 seconds for the continuous tubular type reactor illustrated in application S.N. 88,517, now abondoned, and application S.N. 807,454, now abandoned. In conventional alkylation reactors the reaction time may vary from 5 to 20 minutes.

A more complete understanding of the invention may be had by reference to the accompanying schematic drawing which is an elevation showing a preferred arrangement of apparatus for effecting the invention.

Referring to the drawing, a tubular reactor 10 is connected at the outlet end with acid settler 12 which is provided with a take-off line 14 for alkylate (hydrocarbon phase). An acid return conduit 16 connects with the bottom section of settler 12 and with acid cooler 18 which is provided with indirect heat exchange tubes 20. The inlet end of reactor 10 connects with the acid cooler at the opposite end from conduit 16. Feed line 22 for isoparaffin and olefins connects with an eductor 24 leading into the mouth of tubular reactor 10. By this arrangement, injection of feed thru eductor 24 creates flow of acid into the reactor from acid cooler 18. In accordance with a second embodiment of the invention, a feed line 26 for the lower molecular weight or lighter olefin (propylene) connects with a midsection of reactor 10 for separately injecting this reactant.

Temperature sensing points 28 and 30 are selected near the opposite ends of tubular reactor 10 and the temperature is sensed by temperature controllers 32 and 34, respectively. These temperature controllers are operatively connected with a differential temperature controller 36 which in turn is operatively connected to a motor valve 38 in conduit 16 thru which acid flow from the settler to the cooler takes place. By this arrangement of controls the temperatures at points 28 and 30 are sensed and flow of acid is regulated to maintain a selected differential temperature between the sensing points thru the operation of temperature controllers 32 and 34 and differential temperature controller 36 which automatically regulates the amount of opening of valve 38 to control flow of acid.

To illustrate the invention, the following specific example is presented. It is to be understood that the data presented therein are merely illustrative and are not to be construed as unnecessarily limiting the invention.

*Example*

| | | |
|---|---|---|
| Mixed hydrocarbon fresh feed | bbl./hr | 100 |
| Propylene | percent | 40 |
| Propane | do | 5 |
| Isobutane | do | 10 |
| Butylenes | do | 40 |
| Normal butane | do | 5 |
| | | 100 |

| | | |
|---|---|---|
| Fresh and recycled isobutane (added to fresh feed) | bbl./hr | 506 |
| Propane | percent | 3.7 |
| Isobutane | do | 92.6 |
| Normal butane | do | 3.7 |
| | | 100.0 |

| | | |
|---|---|---|
| Isobutane to olefin volume ratio | | 6:1 |
| Hydrofluoric acid catalyst to reactor | bbl./hr | 2400 |
| Hydrocarbon to acid volume ratio | | 1:4 |
| Alkylate product reactor effluent | bbl./hr | 559 |
| Propane | percent | 4.8 |
| Isobutane | do | 66.2 |
| Normal butane | do | 4.1 |
| Pentanes and heavier | do | 24.9 |
| | | 100.0 |

| | | |
|---|---|---|
| Light alkylate | bbl./hr | 119 |
| Research octane, 3 cc. TEL. | | 103.5 |
| Heavy alkylate | bbl./hr | 20 |

Temperatures:

| | | |
|---|---|---|
| Olefins-isobutane feed, °F. | | 80 |
| Acid charged to reactor, °F. | | 90 |
| Reactor inlet, °F. | | 89 |
| Reactor outlet, °F. | | 105 |

Pressure: To maintain liquid phases in this exothermic reaction.

ΔT range across reactor, °F.[1] ____ 10–35

[1] Depends on olefin type and quantity.

When operating without the ΔT across the reactor for control of catalyst recirculation, on same charge of hydrocarbons:

| | | |
|---|---|---|
| Light alkylate | bbl./hr | 113 |
| Research octane, 3 cc. TEL. | | 102.8 |
| Heavy alkylate | bbl./hr | 19 |

It can be seen that the reactor ΔT control of acid recycle gives a 5.3 percent increase in quantity of light alkylate produced and 0.7 octane increase over prior art operation.

Certain modifications of the invention will become apparent to those skilled in the art and the illustrative details disclosed are not to be construed as imposing unnecessary limitations on the invention.

We claim:

1. A process for alkylating an isoparaffin with at least two different olefins which comprises passing said isoparaffin in admixture with said olefins and HF acid in liquid phase under alkylating conditions thru a single elongated reaction zone free of indirect heat exchange means; introducing said acid in cooled condition relative to reactor outlet temperature to the upstream end of said zone at a temperature substantially below the temperature in said zone so as to effect direct heat exchange with the liquids therein; and maintaining a predetermined temperature differential between the inlet end and the outlet end of said zone by sensing the temperature in said zone adjacent the inlet and outlet ends thereof to obtain a temperature differential and regulating the volume of acid introduced to said zone in response to said temperature differential.

2. The process of claim 1 wherein said olefins include a lighter and a heavier olefin, the heavier olefin is introduced adjacent the upstream end of said zone, and said lighter olefin is introduced at an intermediate section of said zone.

3. The process of claim 1 wherein said olefins are introduced to said zone in admixture adjacent the upstream end thereof.

4. The process of claim 1 wherein said isoparaffin is isobutane and said olefins are butylene and propylene.

5. The process of claim 4 wherein said butylene is introduced to the inlet end of said zone and said propylene is introduced to an intermediate section of said zone.

6. The process of claim 4 wherein said butylene and said propylene are introduced to the upstream end of said zone.

7. The process of claim 1 wherein said selected differential temperature is in the range of 10 to 35° F.

8. The process of claim 1 wherein isobutane is alkylated with butylene and with propylene, the reaction zone inlet temperature is in the range of 60 to 100° F., the reaction zone outlet temperature is in the range of 95 to 130° F., and the selected differential temperature is in the range of 10 to 35° F.

9. Apparatus for alkylating isoparaffins with olefins comprising in combination an elongated tubular reaction chamber free of indirect heat exchange means having an inlet for acid and reactants in its upstream end; a settler connected with the downstream end of said chamber having an outlet for alkylate in an upper section and an outlet for acid in a lower section thereof; conduit means connecting the acid outlet of said settler with the upstream end of said reaction chamber; heat exchange means in said conduit means for cooling said acid; a flow control valve in said conduit means for controlling the quantity of recycled acid; first temperature sensing means in the upstream end of said reaction chamber; second temperature sensing means in the downstream end of said reaction chamber; and a differential temperature controller responsive to and connected with said first and said second temperature sensing means in operative control of said flow control valve.

10. The apparatus of claim 9 including an inlet for an additional olefin in an intermediate section of said chamber.

11. The apparatus of claim 9 wherein said reaction chamber is upright with the upstream end at the bottom, said settler is at a level adjacent the downstream end of said chamber, said conduit means for acid recycle includes a horizontally disposed indirect heat exchanger joined directly at its downstream end to the upstream end of said reaction chamber, and the inlet for reactants comprises an eductor directed upwardly at the juncture of said reaction chamber and said heat exchanger.

References Cited in the file of this patent

UNITED STATES PATENTS

| | | |
|---|---|---|
| 2,386,681 | Hadden | Oct. 9, 1945 |
| 2,431,500 | Penick | Nov. 25, 1947 |
| 2,881,235 | Van Pool | Apr. 17, 1959 |
| 2,910,522 | Gerhold et al. | Oct. 27, 1959 |
| 3,080,438 | Sailors | Mar. 5, 1963 |